United States Patent
Lee et al.

(10) Patent No.: US 7,280,160 B2
(45) Date of Patent: Oct. 9, 2007

(54) APPARATUS FOR AND METHOD OF ADAPTIVELY PROCESSING VIDEO SIGNALS BASED ON A NOISE STATE

(75) Inventors: Sang-soo Lee, Seoul (KR); Ho-nam Lee, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 484 days.

(21) Appl. No.: 10/891,481

(22) Filed: Jul. 15, 2004

(65) Prior Publication Data

US 2005/0041154 A1    Feb. 24, 2005

(30) Foreign Application Priority Data

Jul. 15, 2003    (KR) .................. 10-2003-0048306

(51) Int. Cl.
*H04N 5/21* (2006.01)
(52) U.S. Cl. ........................ 348/620; 348/701
(58) Field of Classification Search ............. 348/700, 348/701, 607, 618–620, 241, 246, 257; 382/261, 382/265, 271; 358/3.26, 463
See application file for complete search history.

(56) References Cited

U.S. PATENT DOCUMENTS

| | | | | |
|---|---|---|---|---|
| 4,183,058 A | * | 1/1980 | Taylor | 365/189.02 |
| 4,339,803 A | * | 7/1982 | Michael et al. | 708/322 |
| 4,652,907 A | * | 3/1987 | Fling | 348/621 |
| 5,185,664 A | * | 2/1993 | Darby | 348/620 |
| 5,675,394 A | * | 10/1997 | Choi | 348/614 |
| 5,715,000 A | * | 2/1998 | Inamori | 348/241 |
| 5,805,721 A |   | 9/1998 | Vuylsteke et al. | |
| 6,144,800 A | * | 11/2000 | Kobayashi | 386/114 |
| 6,285,413 B1 |   | 9/2001 | Akbayir | |
| 7,027,503 B2 | * | 4/2006 | Smee et al. | 375/233 |
| 7,130,481 B2 | * | 10/2006 | Yu | 382/261 |
| 2004/0237103 A1 | * | 11/2004 | Kondo et al. | 725/37 |

FOREIGN PATENT DOCUMENTS

| | | |
|---|---|---|
| JP | 241850 A | 11/2002 |
| KR | 0130342 | 6/1997 |
| KR | 0078437 A | 12/1997 |
| KR | 0007496 A | 3/1998 |
| KR | 002523 A | 1/1999 |

* cited by examiner

*Primary Examiner*—Victor R. Kostak
(74) *Attorney, Agent, or Firm*—Sughrue Mion, PLLC

(57) ABSTRACT

An apparatus for and a method of adaptively processing video signals based on noise states. The method includes, a memory device that stores a look-up table in which optimal filter tap coefficients corresponding to a number of noise levels are registered; a noise measurement unit that obtains a noise measurement from input video signals during a predetermined period; a filter coefficient determination unit that selects optimal filter tap coefficients from the memory based on the noise measurement obtained by the noise measurement unit; a noise suppression filter that employs the optimal filter tap coefficients selected by the filter coefficient determination unit to filter and remove noise from the input video signals; and a video signal processor that performs video signal processing on the result output by the noise suppression filter.

12 Claims, 2 Drawing Sheets

APPARATUS FOR AND METHOD OF ADAPTIVELY PROCESSING VIDEO SIGNALS BASED ON A NOISE STATE

This application claims priority from Korean Patent Application No. 2003-48306, filed on Jul. 15, 2003, in the Korean Intellectual Property Office, the disclosure of which is incorporated herein in its entirety by reference.

BACKGROUND OF THE INVENTION

1. Field of the Invention

The present invention relates to an apparatus for, and method of, processing video signals, and more particularly, to an apparatus for, and method of, adaptively processing video signals according to noise a state, in which coefficients of a filter are optimally adjusted according to the magnitude of a noise included in an input video signal and then the input video signal is filtered by the adjusted filter.

2. Description of the Related Art

Related video signal processing techniques are disclosed in Korean patent No. 1999-2523 and Japanese patent No. 2002-341850. Japanese patent No. 2002-341850 discloses a technique in which the contrast of an input video signal is adjusted by a video amplifier and high frequency noise of signals output by the video amplifier are removed by a low pass filter, so that the contrast of the video signal can be adjusted without being affected by noise.

Korean patent number 1999-2523 discloses a technique to enhance the brightness distributional characteristic of an image in a histogram conversion of a probability density function of an image brightness level by selecting a reference histogram with respect to a histogram of an original image, comparing the accumulated distribution function of the reference histogram with that of the histogram of the original image to generate a conversion function, and applying the conversion function to the original image.

Typically, an apparatus for processing video signals uses a noise-suppression filter to remove noise in an input video signal. However, in the noise-suppression filter, since its tap coefficients are fixed regardless of the noise state, video quality is deteriorated as the noise state changes.

SUMMARY OF THE INVENTION

The present invention provides an apparatus for and method of adaptively processing video signals according to a noise state, in which tap coefficients of a filter are optimally adjusted according to the noise state, the noise being included in an input video signal.

According to an aspect of the present invention, there is provided an apparatus for processing video signals, the apparatus comprising, a memory device that stores a look-up table in which optimal filter tap coefficients corresponding to a number of noise levels are registered; a noise measurement unit that obtains a noise measurement from input video signals during a predetermined period of time; a filter coefficient determination unit that selects optimal filter tap coefficients from the memory device based on the noise measurement obtained by the noise measurement unit; a noise suppression filter that employs the optimal filter tap coefficients selected by the filter coefficient determination unit to filter and remove noise from the input video signals; and a video signal processor that performs video signal processing on the result output by the noise suppression filter.

In accordance with one exemplary embodiment, the video signal processor includes a video enhancer circuit.

According to another embodiment, the predetermined period is set to a frame.

According to another embodiment, the predetermined period is set to a field.

According to another embodiment, the noise measurement unit comprises a delay unit that delays the input video signal by a predetermined time, a subtraction unit that calculates a difference between the present input video signal and the previously input video signal delayed by the delay unit, an absolute value generator that generates an absolute value of the difference output by the subtraction unit; and an accumulator that sums up the absolute values generated by the absolute value generator for the predetermined period and outputs the result as a noise measurement.

According to another embodiment, the predetermined time is set to a frame.

According to another embodiment, the predetermined time is set to a field.

According to another embodiment, the filter coefficient determination unit comprises hardware and software for determining a noise level that corresponds to the noise measurement, calculating a difference between the present and the previous noise levels, and, if the difference is not zero, reading the optimal filter tap coefficients from the look-up table in the memory based on the difference and applying the filter tap coefficients read by the look-up table to the noise suppression filter.

According to another aspect of the present invention, there is provided a method of processing video signals, comprising obtaining a noise measurement from input video signals during a predetermined period; determining optimal filter tap coefficients according to the noise measurements; and replacing filter tap coefficients of a noise suppression filter by the optimal filter tap coefficients.

According to one embodiment with respect to the above aspect, the predetermined period is set to a frame.

According to another embodiment, the predetermined period is set to a field.

According to yet another embodiment, the determining of optimal filter tap coefficients comprises determining a noise level corresponding to the noise measurement; calculating a difference between the previous noise level and the present noise level; and if the difference is not zero, selecting the optimal filter tap coefficients from the look-up table, reflecting the difference of the noise level.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

The present invention now will be described more fully with reference to the attached drawings, in which exemplary embodiments of the invention are shown. This invention may, however, be embodied in many different forms and should not be construed as being limited to the embodiments set forth herein; rather these embodiments are exemplary and are intended to fully convey the concept of the invention to those skilled in the art.

Figure 1:
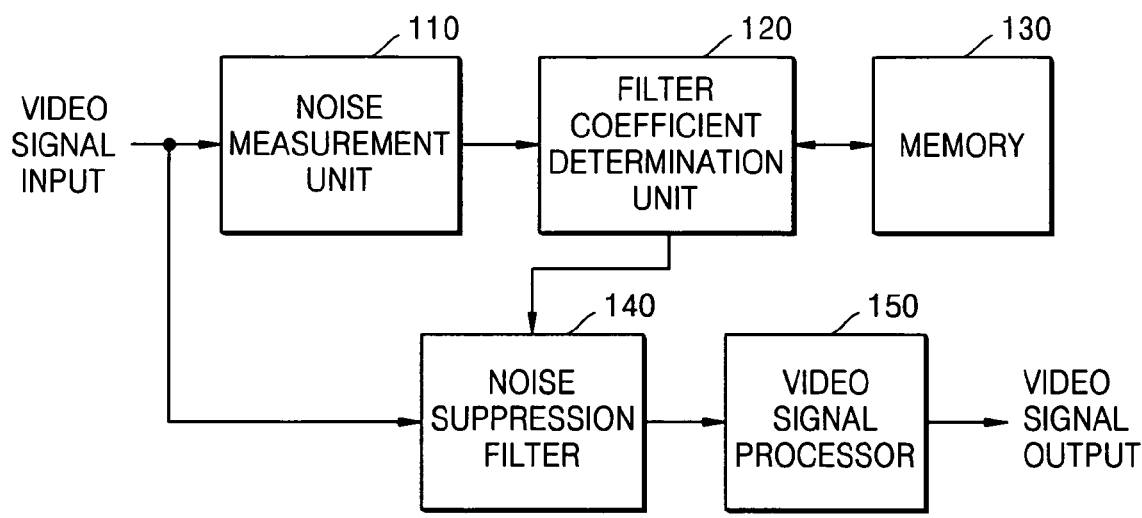
FIG. 1 is a schematic block diagram of an apparatus for adaptively processing video signals based on a noise state, according to an exemplary embodiment of the present invention.

FIG. 1 is a block diagram of an apparatus for adaptively processing video signals according to a noise state, according to an embodiment of the present invention.

Referring to FIG. 1, the apparatus includes a noise measurement unit 110, a filter coefficient determination unit 120, a memory 130, a noise suppression filter 140, and a video signal processor 150.

The memory 130 stores a look-up table of filter tap coefficients. The look-up table is designed to subdivide a noise range into N noise levels, where N is an integer greater than 1, thereby allowing optimal filter tap coefficients to be matched to each of the noise levels.

For instance, N is set to 6, so that the noise range is divided into 6 noise levels. In this case, a noise level of 1 is assigned to correspond to noise values equal to or less than the minimum value of the noise, a noise level of 6 is assigned to correspond to noise values equal to or greater than the maximum value of the noise, and noise levels 2 through 5 are assigned to correspond to noise values between the minimum and maximum values of the noise.

When N is 6, optimal filter tap coefficients are determined and assigned to each of the noise levels 1 through 6. Such a relationship between the optimal filter tap coefficients and the noise levels is registered in the look-up table of the memory 130.

That is, since the noise level of 1 corresponds to a case in which the noise level in the video signal is small, the filter tap coefficients that correspond to the noise level of 1 may be determined so as to comparatively lessen noise suppression, thereby reducing loss of the video signal.

In addition, since the noise level of 6 corresponds to a case in which the noise level in the video signal is large, the filter tap coefficients that correspond to the noise level of 6 may be determined so as to comparatively strengthen noise suppression, risking the loss of the video signal to a certain extent, so as to reduce the noise.

Figure 2:
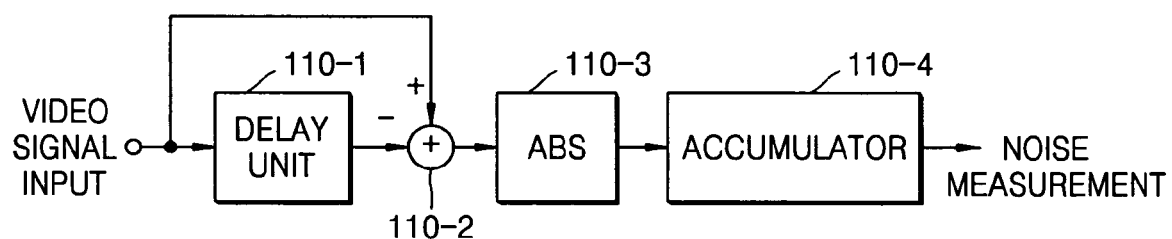
FIG. 2 is a detailed block diagram of a noise measurement unit of FIG. 1.

The noise measurement unit 110 obtains a noise measurement from the input video signals during the period of a frame or a field, a detailed structure of which is shown in FIG. 2.

Referring to FIG. 2, the noise measurement unit 110 includes a delay unit 110-1, a subtraction unit 110-2, an absolute value operation unit 110-3, and an accumulator 110-4.

The delay unit 110-1 delays the input video signal, for example, by a frame or a field.

When the delay time of the delay unit 110-1 is a frame, the subtraction unit 110-2 calculates the difference between pixel data at the same position in two consecutive frames.

The absolute value generator 110-3 generates an absolute value of the difference output by the subtraction unit 110-2.

The accumulator 110-4 sums up all the absolute values of the differences between the pixel data at the same positions in two consecutive frames.

The higher the noise level in the input video signal, the larger the difference between the pixel data at the same position in consecutive frames. Therefore, the result output by the accumulator 110-4 corresponds to a noise measurement during the period of a frame.

As described above, the noise measurement unit 110 of FIG. 2 obtains the noise measurement from the input video signals during the period of a frame (or alternatively, during the period of a field).

Figure 3:
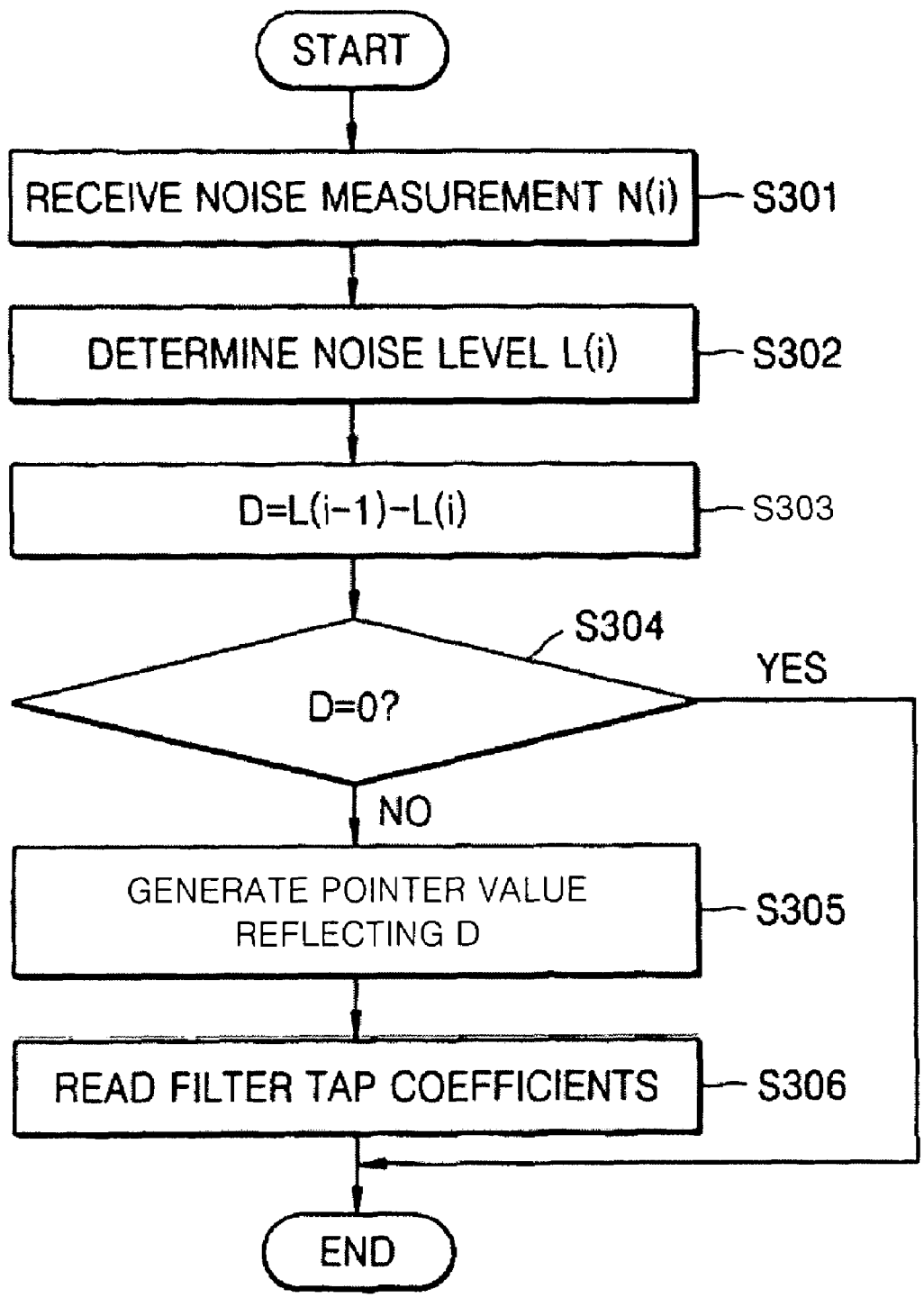
FIG. 3 is a flowchart of a method of determining optimal filter tap coefficients, which is performed by a filter coefficient determination unit of FIG. 1.

Referring back to FIG. 1, the filter coefficient determination unit 120 uses the look-up table of the memory 130 to determine optimal tap coefficients of the noise suppression filter 140 based on the noise measurement. The method of determining the optimal tap coefficients will be described in conjunction with FIG. 3.

First, the filter coefficient determination unit 120 receives the noise measurement N(i) of the present frame from the noise measurement unit 110 in step S301, and determines a noise level L(i) that matches the noise measurement N(i) in step S302.

Thereafter, the filter coefficient determination unit 120 calculates a difference D between a noise level L(i−1) of a previous frame and the noise level L(i) of the present frame in step S303.

In step S304, the filter coefficient determination unit 120 determines whether the difference D is zero.

If the difference D is not zero in step S304, the filter coefficient determination unit 120 generates a pointer value reflecting the difference D in step S305. The pointer value is an indicator for indicating certain positions in the look-up table, from which the optimal tap coefficients of the noise suppression filter 140 are read out.

Then, with the help of the pointer value generated in step S305, the filter coefficient determination unit 120 reads the optimal filter tap coefficients from the look-up table in the memory 130 in step S306.

Meanwhile, if the difference D is zero in step S304, the filter coefficient determination unit 120 determines that there has been no change in the noise level of the present frame and the previous frame and that there is no need to change the present filter tap coefficients of the noise suppression filter 140, so that the filter coefficient determination unit 120 skips reading the filter tap coefficients from the memory 130.

Accordingly, the noise suppression filter 140 can have optimal filter tap coefficients according to the noise level in the input video signal, thereby efficiently removing the noise while minimizing the loss of the input video signal.

Referring back to FIG. 1, the video signal processor 150 receives the input video signal that has been filtered by the noise suppression filter 140 having optimal filter tap coefficients, and converts a format of the input video signal to be suitable for a display (not shown). Also, the video signal processor 150 may include a video enhancer circuit to improve the quality of the video signal.

As described above, according to the present invention, even if the noise level in the input video signal varies, the video signal can be optimally processed by changing the filter tap coefficients of the noise suppression filter according to the amount of the noise.

It is possible that the method and apparatus described above according to the present invention are implemented as computer-readable codes recorded on a recording medium accessible by a computer. Examples of the recording medium include all kinds of recording devices, such as ROM, RAM, CD-ROM, magnetic tape, hard discs, floppy discs, flash memory, optical data storage devices, and carrier waves, in which computer-readable data can be stored. In addition, the computer-readable codes can be distributed among recording media of a plurality of computer systems connected to a network, and executed in that distributed form, using a distribution method.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus for processing video signals, comprising:
a memory device operable to store a look-up table in which optimal filter tap coefficients corresponding to a number of noise levels are registered;
a noise measurement unit operable to obtain a noise measurement from input video signals during a period;
a filter coefficient determination unit operable to select optimal filter tap coefficients from the memory device based on the noise measurement obtained by the noise measurement unit;
a noise suppression filter operable to employ the optimal filter tap coefficients selected by the filter coefficient determination unit to filter and remove noise from the input video signals; and
a video signal processor operable to perform video signal processing on the result output by the noise suppression filter;
wherein the noise measurement unit comprises
a subtraction unit which calculates differences between pixel data of the input video signals corresponding to respective same positions during the period;
an absolute value generator which generates absolute values of the differences; and
an accumulator which sums up the absolute values, wherein the sum corresponds to noise measurement from input video signals.

2. The apparatus of claim 1, wherein the video signal processor includes a video enhancer circuit operable to enhance the quality of the video signals.

3. The apparatus of claim 1, wherein the period comprises a frame of video data.

4. The apparatus of claim 1, wherein the period comprises a field of video data.

5. An apparatus for processing video signals, comprising:
a memory device operable to store a look-up table in which optimal filter tap coefficients corresponding to a number of noise levels are registered;
a noise measurement unit operable to obtain a noise measurement from input video signals during a period;
a filter coefficient determination unit operable to select optimal filter tap coefficients from the memory device based on the noise measurement obtained by the noise measurement unit;
a noise suppression filter operable to employ the optimal filter tap coefficients selected by the filter coefficient determination unit to filter and remove noise from the input video signals; and
a video signal processor operable to perform video signal processing on the result output by the noise suppression filter,
wherein the noise measurement unit comprises:
a delay unit operable to delay the input video signal by an amount of time;
a subtraction unit operable to calculate a difference between a present input video signal and a previously input video signal delayed by the delay unit;
an absolute value generator operable to generate an absolute value of the difference calculated by the subtraction unit; and
an accumulator operable to sum one or more absolute values generated by the absolute value generator for the period and output the result as a noise measurement.

6. The apparatus of claim 5, wherein the amount of time comprises an amount of time corresponding to a frame of video data.

7. The apparatus of claim 5, wherein the amount of time comprises an amount of time corresponding to a field of video data.

8. The apparatus of claim 1, wherein the filter coefficient determination unit comprises hardware and software operable to determine a noise level that corresponds to the noise measurement, calculate a difference between a present and a previous noise level, and, if the difference is not zero, read the optimal filter tap coefficients from the look-up table in the memory device based on the difference and apply the filter tap coefficients read by the look-up table to the noise suppression filter.

9. A method of processing video signals, comprising: obtaining a noise measurement from input video signals during a period; determining optimal filter tap coefficients according to the noise measurements; and replacing filter tap coefficients of a noise suppression filter by the optimal filter tap coefficients;
wherein obtaining the noise measurement comprising calculating differences between pixel data of the input video signals corresponding to respective same positions during the period;
generating absolute values of the differences; and
summing up the absolute values, wherein the sum corresponds to noise measurement from the input video signals.

10. The method of claim 9, wherein the period comprises a period corresponding to a frame of video data.

11. The method of claim 9, wherein the period comprises a period corresponding to a field of video data.

12. The method of claim 9, wherein the determining of optimal filter tap coefficients comprises:
determining a noise level corresponding to the noise measurement;
calculating a difference between the previous noise level and the present noise level; and if the difference is not zero, selecting the optimal filter tap coefficients from the look-up table, reflecting the difference of the noise level.

* * * * *